UNITED STATES PATENT OFFICE.

URIAL K. MAYO, OF BOSTON, MASSACHUSETTS.

ANÆSTHETIC MIXTURE.

SPECIFICATION forming part of Letters Patent No. 283,800, dated August 28, 1883.

Application filed June 2, 1883. (No specimens.)

*To all whom it may concern:*

Be it known that I, URIAL KING MAYO, of Boston, of the county of Suffolk, of the Commonwealth of Massachusetts, have invented a new and useful Improvement in Anæsthetics; and I do hereby declare the same to be described in the following specification.

Nitrous oxide, or "laughing-gas," as otherwise termed, has for several years past been employed to produce anæsthesia for surgical operations, more especially in the extraction of teeth; but it frequently does not operate with the desired effect, or is unreliable and dangerous, as it occasionally produces on the patient a deathly pallor, checks the insensible perspiration, and retards circulation of the blood.

In making my invention, which is the result of much practice and repeated experiments, I have sought to combine with the nitrous oxide a sedative or sedatives, or something whereby its dangerous or disagreeable effects, as mentioned, will be prevented, and enable it to be employed in most, if not all, surgical operations with comparative, if not entire, safety and success.

I have discovered that by impregnating the gas with the vapor of an alcoholic infusion of hops and poppies I can render it practically innocuous, and especially advantageous, when used by inhalation, to produce insensibility to pain, as when so employed it not only operates quicker, but induces a natural and gentle perspiration and preserves the pulse at or about at its normal condition. It is specially soothing and agreeable to those who may inhale it.

In preparing the new anæsthetic I make a strong alcoholic tincture of hops and poppies, using to a quart of alcohol about six ounces of hops and three ounces of poppies. To the alcohol I add two quarts of water. Through this aqueous and alcoholic infusion or tincture I pass the nitrous-oxide gas in its course from the producing-retort to the gasometer used to contain it. In this way I can have with the gas an aqueous alcoholic vapor impregnated with the narcotic and other effective principles of the hops and poppies.

I do not confine the composition to the precise proportions given for its constituents, as they may be varied somewhat and still be productive of good effects.

I would remark that the employment of either hops or poppies alone will not be productive of the desired useful results that follow from an aqueous alcoholic infusion of both of them.

I claim as my invention—

An anæsthetic compound consisting of nitrous-oxide gas and the vapors of an aqueous alcoholic tincture or infusion of hops and poppies combined, substantially as set forth.

URIAL K. MAYO.

Witnesses:
R. H. EDDY,
E. B. PRATT.